US010588069B1

(12) United States Patent
Chen et al.

(10) Patent No.: US 10,588,069 B1
(45) Date of Patent: Mar. 10, 2020

(54) ROUTE DISCOVERY IN WIRELESS MESH NETWORKS

(71) Applicant: Amazon Technologies, Inc., Seattle, WA (US)

(72) Inventors: Xi Chen, San Jose, CA (US); Ashish Kumar Shukla, Milpitas, CA (US); Avinash Joshi, San Jose, CA (US); Qiang Hu, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 15/801,732

(22) Filed: Nov. 2, 2017

(51) Int. Cl.
*H04W 40/04* (2009.01)
*H04L 12/721* (2013.01)
*H04L 12/875* (2013.01)
*H04W 84/18* (2009.01)

(52) U.S. Cl.
CPC .......... *H04W 40/04* (2013.01); *H04L 45/123* (2013.01); *H04L 45/26* (2013.01); *H04L 45/124* (2013.01); *H04L 47/56* (2013.01); *H04W 84/18* (2013.01)

(58) Field of Classification Search
CPC ...... H04W 40/04; H04W 84/18; H04L 45/26; H04L 45/123; H04L 45/124
See application file for complete search history.

(56) References Cited

U.S. PATENT DOCUMENTS

| 2010/0290441 | A1* | 11/2010 | Stewart | H04W 40/04 370/338 |
| 2011/0019686 | A1* | 1/2011 | Seok | H04W 40/26 370/428 |
| 2011/0128918 | A1* | 6/2011 | Zhai | H04L 45/125 370/328 |
| 2011/0176416 | A1* | 7/2011 | Bhatti | H04N 7/18 370/230 |

OTHER PUBLICATIONS

Chapter 11, 802.11r, 802.11k, 802.11v, 802.1w Fast Transition Roaming, 28 pages, Dec. 7, 2016.
IEEE Std 802.11-2016, IEEE Standard for Information Technology—Local and Metropolitan Area Networks—Specific Requirements, Part 11: Wireless LAN MAC and PHY Specifications, pp. 205-209, 496-507, 520-527, 1024-1032, 1047, 1247-1259, 1404-1414, 1493-1499, 1659, 2084, 2132-2224, 2749, 3510-3517, Jul. 11, 2017.

* cited by examiner

*Primary Examiner* — Min Jung
(74) *Attorney, Agent, or Firm* — Lowenstein Sandler LLP

(57) ABSTRACT

A method of route discovery in wireless mesh networks comprises: receiving, by a first mesh network device of a wireless mesh network, from a second mesh network device of the wireless mesh network, a first route request identifying a destination mesh network device of the wireless mesh network and a first path selection metric value; determining a path selection metric increment, wherein the path selection metric increment reflects a radio channel contention by the first mesh network device and the second mesh network device; generating a second path selection metric value by (Continued)

adding the path selection metric increment to the first path selection metric value; and broadcasting a second route request identifying the destination mesh network device and the second path selection metric value.

20 Claims, 10 Drawing Sheets

| Destination node ID 520 | DSN 530 | Path selection metric value 540 | Hop count 550 | Next node on the path 560 | [other information] |
|---|---|---|---|---|---|
| 00-14-22-01-23-45 | 465 | 1234 | 3 | 00-14-22-01-23-95 | |
| 00-14-22-01-23-45 | 1024 | 2345 | 4 | 00-14-22-01-23-97 | |
| 00-14-22-01-23-60 | 2345 | 3456 | 5 | 00-14-22-01-23-55 | |
| 00-14-22-01-23-50 | 732 | 4567 | 4 | 00-14-22-01-23-72 | |

Routing table 500

ROUTE DISCOVERY IN WIRELESS MESH NETWORKS

BACKGROUND

A wireless mesh network may support establishing point-to-point wireless links between the participating communication devices. A network node may employ a path selection method supported by the network to discover a route to a desired destination.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

FIG. 5 schematically illustrated an example structure of a routing table maintained by a mesh network node in one embodiment.

DETAILED DESCRIPTION

Described herein are systems and methods for routing in mesh networks. Nodes of a mesh network may establish peer-to-peer wireless links for transmitting messages to each other. In particular, messages may be transferred, through other nodes, between the source and destination nodes that are not in direct communication with each other. If more than one path exists between the source and destination nodes, the best path may be selected which has the minimal value of a path selection metric. In one example, a mesh network may utilize an airtime-based path selection metric for determining the best network path between the source and destination nodes. The airtime based metric reflects the time of delivering the frame from the source to the destination node. However, the airtime based path selection metric fails to take into account radio interference and various other factors which may affect the overall data transmission performance, and thus may yield suboptimal routes with good data transmission rated at the physical layer (PHY) interface, but at the same time with relatively poor performance due to considerable radio interference levels.

Furthermore, the end user's experience may be affected by various other parameters. For example, in a distributed audio or video streaming network, a small end-to-end delay (also referred herein as "latency") may be tolerated, while the data rate is expected to be consistently high (e.g., near 3 Mbps) for long periods of time (e.g., 30-60 minutes), and the data rate should not drop significantly (e.g., not lower than 1 Mbps) even if a large number of users would join the network. Accordingly, the routing performance in a distributed audio or video streaming network may be measured by the end-to-end delay and end-to-end throughput.

Accordingly, in one embodiment, the present disclosure provides a path selection metrics which represents the "path time" (e.g., the end-to-end delivery time over a network path) and is designed to maximize the path throughput while providing reasonably low latency (e.g., not exceeding a pre-defined latency threshold), by taking into account the transmission error rate, the radio channel contention, the amount of data which is queued by the transmitting nodes and/or various other parameters.

Various aspects of the above referenced methods and systems are described in details herein below by way of example, rather than by way of limitation.

Figure 1:
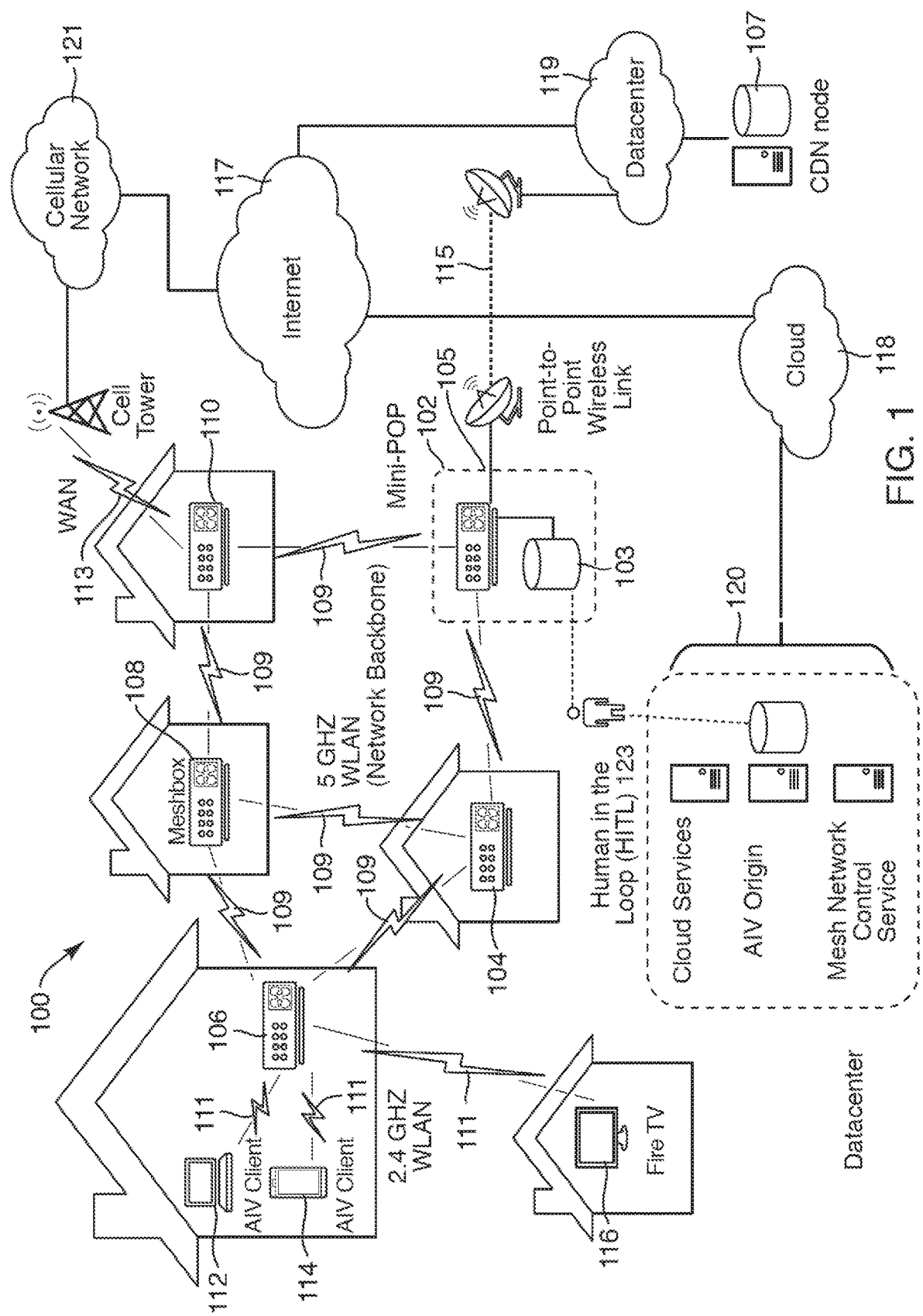
FIG. 1 is a component diagram illustrating hardware devices organized in a wireless mesh network.

FIG. 1 is a component diagram illustrating hardware devices organized in a wireless mesh network. As illustrated by FIG. 1, hardware devices 102-110 may be organized in a mesh network 100, for content distribution to client devices in an environment of limited connectivity to broadband Internet infrastructure in order to transfer digital content to one or more client consumption devices. In the depicted embodiment, the mesh network 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the mesh network 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the mesh network 100 for the content files stored in the mesh network 100. Meaning the mini-POP 102 may be the only node in the mesh network 100 having access to the attached storage or a communication channel to retrieve content files stored outside of the mesh network 100. In other embodiments, multiple mini-POP devices may be deployed in the mesh network 100, but the number of mini-POP devices should be much smaller than a total number of network hardware devices in the mesh network 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the mesh network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the mesh network 100. In some cases, the mini-POP device 102 does not have an Internet connection via the point-to-point wireless connection 105 and the content is stored only in the attached storage device 103 for a self-contained mesh network 100.

The mesh network 100 also includes multiple mesh nodes 104-110 which may establish multiple P2P wireless connections 109 among themselves in order to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) may be provided by multi-channel (MRMC) mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the mesh network 100. In particular, the second mesh node 106 is wirelessly coupled to a first client consumption device 112 (Amazon Instant Video (AIV) client) via a first N2C wireless connection 111, a second client consumption device 114 (AIV client) via a second N2C wireless connection 111, and a third client consumption device 116 (e.g., the Fire TV device) via a third N2C wireless connection 111. The second mesh node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be application programming interfaces (APIs) provided for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the mesh network 100 remotely. Also, the cellular connection 113 may aid in the debugging and optimization of the mesh network 100. In other embodiments, other low bandwidth services may also be offered through this link (e.g. email, shopping on Amazon.com, or the like).

Although only four mesh nodes 104-110 are illustrated in FIG. 1, the mesh network 100 can use many mesh nodes, wireless connected together in a mesh network, to move content through the mesh network 100. The 5 GHz WLAN channels are reserved for inter-node communications (i.e., the network backbone). Theoretically, there is no limit to the number of links a given mesh node can have to its neighbor nodes. However, practical considerations, including memory, routing complexity, physical radio resources, and link bandwidth requirements, may place a limit on the number of links maintained to neighboring mesh nodes. Mesh nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each mesh node can support depends on a number of factors including memory, bandwidth requirements of the client, incoming bandwidth that the mesh node can support, and the like. For example, the mesh nodes provide coverage to users who subscribe to the content delivery service and consume that service through an AIV client on the client consumption devices (e.g., a mobile phone, a set top box, a tablet, or the like). It should be noted that there is a 1-to-many relationship between mesh nodes and households (not just between nodes and clients). This means the service can be provided without necessarily requiring a customer to have a mesh node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The mesh nodes can be located in various structures, and there can be multiple mesh nodes in a single structure.

The mesh network 100 may be used to accomplish various tasks, including moving high bandwidth content to users and storing that content in the network itself. The content moving task may be performed by hardware using the radio links between mesh nodes and the radio links between mesh nodes and client consumption devices, and by software using the routing protocols used to decide where to push traffic and link and channel management used to configure the mesh network 100. The content storing task may be performed using caches of content close to the user. An example content delivery network (CDN) implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the mesh network 100 includes the mini-POP device 102 that is designed to handle smaller amounts of traffic than a typical POP rack. Architecturally, the mini-POP device 102 may be designed as a mesh node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache.

The mesh network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The mesh network 100 has multiple devices, each with multi-radio multi-channel (MRMC) radios. The multiple radios for P2P connections and N2C connections of the mesh network devices allow the mesh network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. A "hop" as used herein may refer to a portion of a network path between two neighboring nodes. The paths to fetch content files may not be a linear path within the mesh network.

The mesh network 100 can provide adequate bandwidth, especially node-to-node bandwidth. For video, content delivery services recommend a minimum of 900 Kbps for standard definition content and 3.5 Mbps for high definition content. The mesh network 100 can provide higher bandwidths than those recommended for standard definition and high definition content.

In some embodiments, the mesh network 100 can be self-contained as described herein. The mesh network 100 may be self-contained in the sense that content resides in, travels through, and is consumed by nodes in the mesh network without requiring the content to be fetched outside of the mesh network 100. In other embodiments, the mesh network 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the mesh network 100 via the point-to-point wireless connection 105 or the HITL process at the mini-POP device 102.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication).

The mesh network 100 can provide some fault tolerance so that a single mesh node becoming unavailable for failure or reboot has minimal impact on availability of content to other users. The mesh network 100 can be deployed in an unpredictable environment. Radio conditions may not be constant and sudden losses of power may occur. The mesh network 100 is designed to be robust to temporary failures of individual nodes. The mesh network 100 can be designed to identify those failures and adapt to these failures once identified. Additionally, the mesh network 100 can include mechanisms to provide secure storage of the content that resides within the mesh network 100 and prevent unauthorized access to that content.

The cloud services 120 of the mesh network 100 can include mechanisms to deal with mesh nodes that become unavailable, adding, removing, or modifying existing mesh nodes in the mesh network 100. The cloud services 120 may also include mechanisms for remote health and management. For example, there may be a remote health interface, a management interface, or both to access the mesh nodes for this purpose. The cloud services 120 can also include mechanisms for securing the mesh network 100 and the content that resides in the mesh network 100. For example, the cloud services 120 can control device access, digital rights management (DRM), and node authentication.

Other use cases of mesh networks operating in accordance with the embodiments of the present disclosure include employing mesh networks for residential, office, campus/community and public safety uses. In one example, mesh networks described herein may be employed to eliminate radio frequency dead spots and areas of low-quality wireless coverage in private residences or public spaces. In another example, mesh networks described herein may be employed to provide network access to emergency and safety personnel such as fire, police, and emergency medical technicians responding to an incident scene. Possible use cases of mesh networks operating in accordance with the embodiments of the present disclosure are not limited to the above-described examples.

Figure 2:
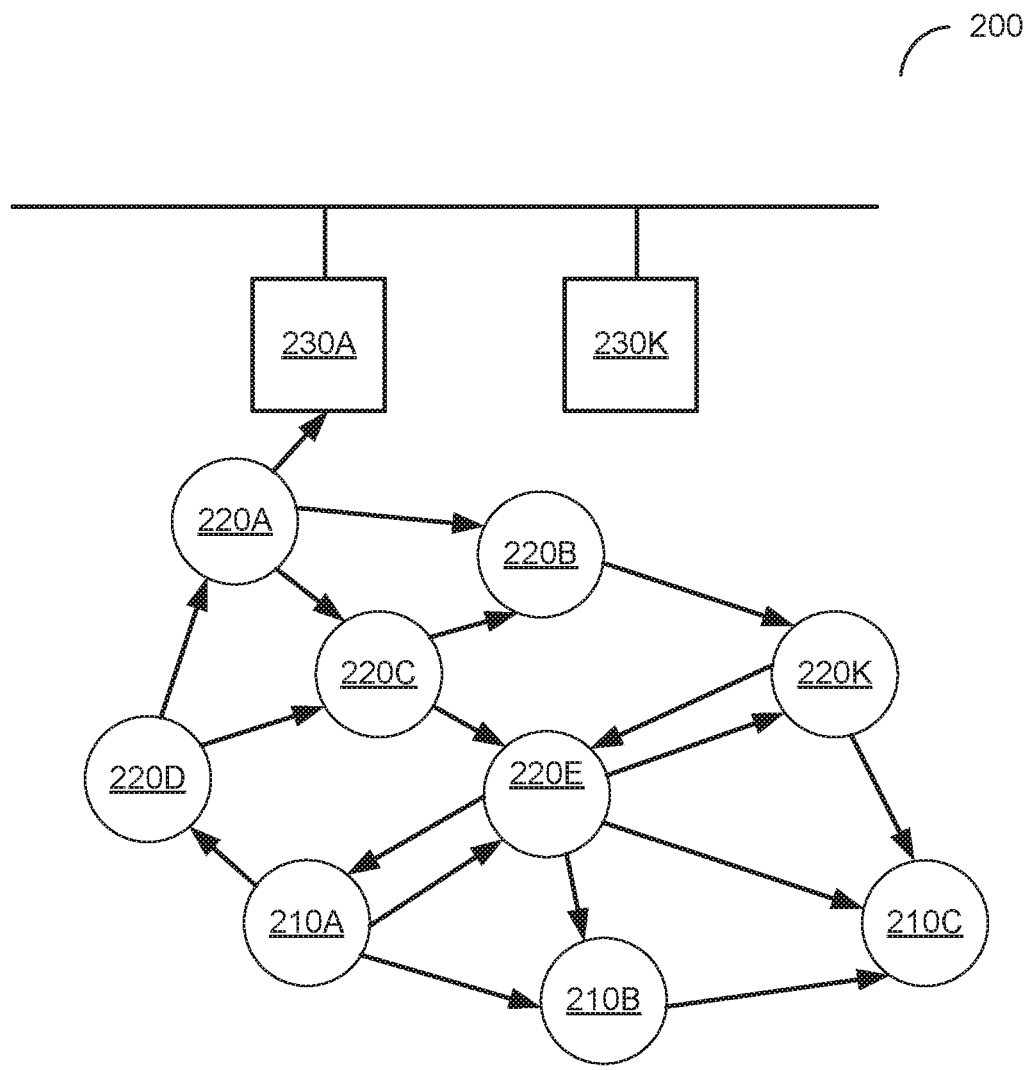
FIG. 2 is a functional network diagram of an illustrative example of a wireless mesh network operating in accordance with the embodiments of the present disclosure.

FIG. 2 is a functional network diagram of an illustrative example of a wireless mesh network operating in accordance with the embodiments of the present disclosure. In one embodiment, each of the network devices of wireless mesh network 100 of FIG. 1 may implement functions of one or more functional components of FIG. 2. In other embodiments, various other wireless mesh networks may comprise hardware and/or software components which may implement functions of one or more functional components of FIG. 2.

As schematically illustrated by FIG. 2, an example wireless mesh network 200 may comprise a plurality of mesh network nodes including communication devices that implement the functions of wireless mesh point stations (MP STA) 210A-210Z, mesh access points (MAP) 220A-220K, and mesh portals (MPP) 230A-220M. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that comprises hardware and/or software for implementing MAC and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal is a wireless access point that provides distribution and integration services (i.e., MSDU translation to another network format and MSDU forwarding to a wireless or wired destination), e.g., by one or more wireline or wireless connections to a backbone network.

As noted herein above, mesh network nodes may establish peer-to-peer wireless links and transmit messages to each other. In particular, messages may be transferred, through other nodes, between two nodes that are not in direct communication with each other. Thus, a node may be a source, a destination, or an intermediate node on a mesh path.

Upon booting up, a mesh network node may discover and join the mesh network by transmitting beacon, probe request, and probe response frames. These and other frames transmitted by a mesh network node may include a mesh profile, which in turn includes a mesh identifier element and a mesh configuration element. The mesh identifier may identify a mesh basic service set (MBSS), which may be viewed as an elementary mesh network. The mesh configuration element may specify, among other mesh network parameters, the active path selection protocol and the active path selection metric to be employed by participating network devices for path discovery.

In one embodiment, a wireless mesh network operating in accordance with the embodiments of the present disclosure (e.g., wireless mesh network 100 of FIG. 1) may support the Hybrid Wireless Mesh Protocol, which implements both dynamic (reactive) path selection (i.e., best path selection by a node that needs to transmit a frame to a destination for which no path is known to the source node) and proactive path selection (i.e. determining best path to any destination before needing to send any data frame to that destination). In both modes, if more than one path exists between the source and destination nodes, the path having the minimal value of the path selection metric is selected. In one embodiment, the path selection metric may reflect the time of delivering the frame from the source to the destination node.

Figure 3:
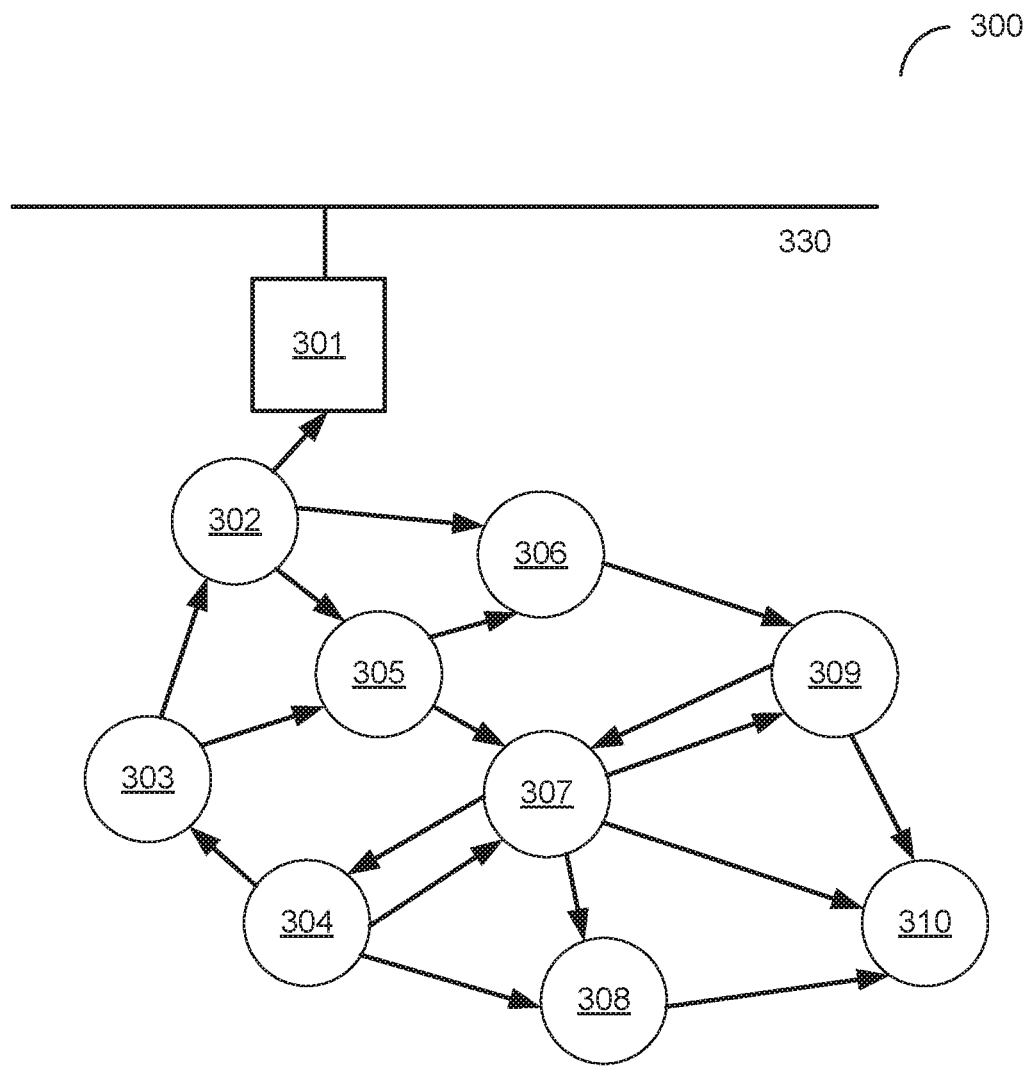
FIG. 3 schematically illustrates one embodiment of the dynamic (reactive) path selection mode in a wireless mesh network.

FIG. 3 schematically illustrates one embodiment of the dynamic (reactive) path selection mode in a wireless mesh network. In the example illustrated by FIG. 3, the wireless mesh network 300 may include nodes 301-310. The source node 304 may employ the dynamic path selection mode to find a path to the destination node 309. The source node 304 may broadcast a network management frame including a route request (RREQ) information element specifying the destination node 309 (e.g., using the MAC address of the destination node 309) and initializing the metric field to zero. Responsive to receiving a RREQ, an intermediate node (e.g., a node 303, 307, or 308) may increment the metric field of the RREQ to reflect the airtime of the last hop leading to this node. The intermediate node may then create a route to the source node 304 or update a known route to the source node 304, and re-broadcast the RREQ by forwarding it to its neighboring nodes. Thus, whenever an intermediate node forwards a RREQ, the metric field in the RREQ will be updated to reflect the cumulative metric of the route to the source of the RREQ.

Responsive to receiving a RREQ, the destination node 309 may increment the metric field of the RREQ to reflect the airtime of the last hop leading to the destination node. The destination node 309 may then select, among a plurality of candidate network paths between the source node and the destination node, the network path having a minimal value of the path selection metric. The destination node 309 may send a unicast route reply (RREP) back to the source node 304.

Responsive to receiving a network management frame including the RREP information element specifying the destination, an intermediate node (e.g., a node 303, 307, or 308) may create or update a route to the destination node 309 and forward the RREP towards the source node 304. Upon receiving the RREP, the source node 304 may create a route to the destination node 309. Upon receiving further RREQs specifying the same source node 304 with a metric value better than the existing route, the destination node 309 may update its route to the source 304 and send a new RREP to the source node 304 along the updated route. Participating network nodes may store the created and/or updated routes in their respective routing tables. Thus a bidirectional, best metric end-to-end route is established between the source and destination.

In order to produce loop-free paths, each network node may maintain a destination sequence number (DSN) associated with every destination within the mesh network. The DSN is incremented each time when a new network path to the destination is created, and thus the DSN represents an identifier of the current route to the destination. Accordingly, a known route is updated in response to receiving a RREP if the DSN specified by the RREP exceeds the current DSN maintained by the receiving node in association with the destination node specified by the RREP, or if the two DSNs match and the new route provides a better metric value than the existing route. Similarly, a known route is updated in response to receiving a RREQ if the DSN specified by the RREQ exceeds the current DSN maintained by the receiving node in association with the source node specified by the RREQ, or if the two DSNs match and the new route provides a better metric value than the existing route.

While in the example of FIG. 3 the destination node 309 is within the mesh network, in various other examples the destination may be outside of the wireless network, in which situation the source node may first discover the route to the mesh portal 301, which may then forward the messages to the desired destination via a wired network 330.

While the dynamic path selection mode is utilized in the routing examples described herein, methods and systems of the present disclosure may operate in both dynamic and proactive path selection modes.

Figure 4:
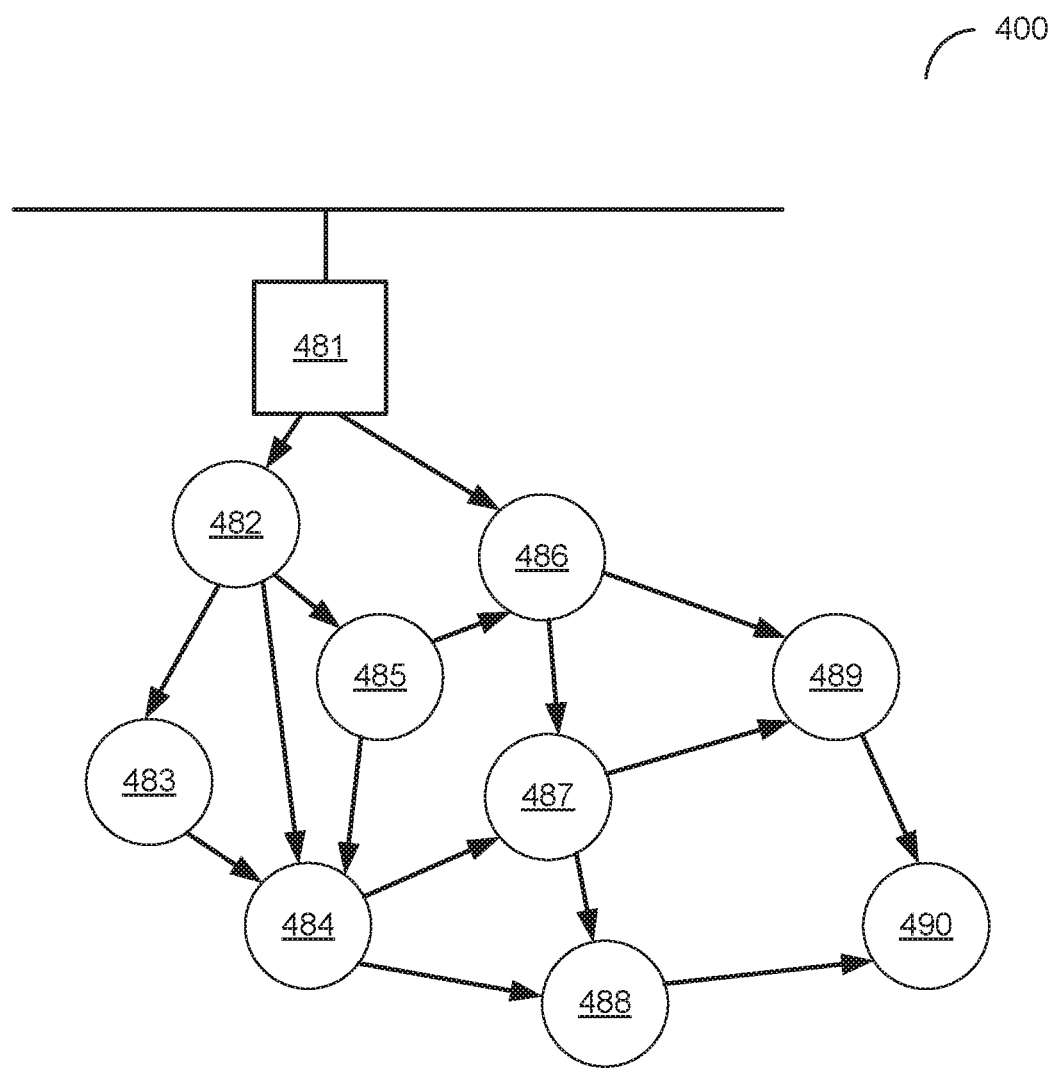
FIG. 4 schematically illustrates one embodiment of the proactive path selection mode in a wireless mesh network.

FIG. 4 schematically illustrates one embodiment of the proactive path selection mode in a wireless mesh network. In the example illustrated by FIG. 4, the wireless mesh network 400 may include nodes 481-490. In the proactive path selection mode, the source node 484 may implement a distance vector routing method to find and maintain a route to the network root 481. The root node 481 may maintain active paths to the plurality of nodes 482-489. Thus, the source node 484 may forward an outgoing frame to the root node 481, which may then forward it to the specified destination.

In one embodiment, the root node 481 may be advertised using a broadcast network management frame including the root announcement (RANN) information element. Each broadcast round may be identified by a respective DSN. Responsive to receiving a root announcement, a node (e.g., node 482 or 486) may build a route to the root node 481, e.g., by sending a unicast RREQ to the root node 481.

Alternatively, the routing tree building process may be initiated by the root node 481 by periodically broadcasting a proactive RREQ message with the metric value initialized to zero. Each broadcast round may be identified by a respective DSN.

Responsive to receiving a RREQ, a node (e.g., node 482 or 486) may increment the metric field of the RREQ to reflect the airtime of the last hop leading to this node. The node may then create or update a route to the root node 481, and re-broadcast the RREQ by forwarding it to its neighboring nodes (e.g., nodes 483, 484, and 489). Thus, whenever an intermediate node forwards a RREQ, the metric field in the RREQ will be updated to reflect the cumulative metric of the route to the root node 481. A node may update its current route to the root node 481 if the RREQ contains a DSN exceeding the DSN associated with the existing route to the root node 481, or if the DSNs are the same and the RREQ provides a better metric value than the metric value associated with the existing route to the root node 481. Thus, the information about the presence of the root node 481 and routes to the root node 481 are disseminated to a plurality of nodes 482-490 of the wireless mesh network 400. Participating network nodes may store the created and/or updated routes in their respective routing tables.

In some embodiments, a node may transmit a network management frame including a route error (RERR) information element for announcing a broken link to other nodes that may have active paths over this broken link. For example, a node may transmit a RERR upon detecting a broken link on the next hop of an active path which is stored by the node. A node receiving the RERR may invalidate the paths to the unreachable destinations announced by the RERR. The node may also forward the RERR it to its neighboring nodes. In some embodiments, the node may initiate path discovery to one or more destinations announced by the RERR.

In one embodiment, RREQ, RREP, RERR and/or other information elements transmitted by the participating nodes may specify a time-to-live (TTL) value which is initialized to a pre-defined constant value by the originator node of the information element and represents the maximum number of hops that the information element is allowed to be forwarded. Accordingly, each receiving node may decrement the value of the TTL field before re-transmitting the information element, and may further discard the information element if the decremented value reaches zero.

In one embodiment, RREQ, RREP, RERR and/or other information elements transmitted by the participating nodes may further specify a hop count value which is initialized to zero by the originator node of the information element and is incremented by each receiving node before being forwarded. Thus, the hop count value represents the number of hops to the originator node, and may be combined with the metric value to determine the best path.

FIG. 5 schematically illustrated an example structure of a routing table maintained by a mesh network node in one embodiment. An example routing table 500 can include a plurality of routing entries 510A-510Z. Each routing entry 510 may be identified by the destination node identifier 520 (represented, e.g., by the MAC address of the destination node). Each routing entry 510 may further include the DSN 530 maintained by the local mesh network node in association with the destination identified by the destination node identifier 520. Each routing entry 510 may further include the path selection metric value 540 of the network path represented by the path selection entry. Each routing entry 510 may further include the hop count 550 of the network path represented by the path selection entry. Each routing entry 510 may further include the identifier 560 of the next node on network path represented by the path selection entry. The routing table 500 may include various other fields which are omitted from FIG. 5 for clarity and conciseness.

While the example routing table 500 is depicted in FIG. 5 as a rectangular table, various data structures may be employed for storing the routing table in the memory of the mesh network node. For example, the routing table 500 may be stored as a two-dimensional array, each row of which represents a respective routing entry 510, and the columns represent the routing entry fields 520-560. In another example, the routing table 500 may be stored as a one-dimensional array of structures, such that each array element stores a structure representing a routing table entry 510 and includes the routing entry fields 520-560.

In one embodiment, the routing table 500 may be indexed by the destination node identifier 520, thus providing for the efficient search and retrieval of routing data. For example, a mesh network node may retrieve a routing entry identified by a particular destination in preparation for forwarding a data frame to the specified destination node. In another example, a mesh network node may retrieve a routing entry identified by a particular destination in order to compare the metric value of the currently stored network path to the destination and the metric value specified by a RREQ or RREP information element. In another example, a mesh network node may retrieve a routing entry identified by a particular destination in order to invalidate the routing entry, e.g., in response to receiving a RREQ information element.

As noted herein above, the airtime-based path selection metric, which reflects the time of delivering the frame from the source to the destination node, may fail to account for various other performance parameters which may affect the end user's experience, such as the end-to-end delay and end-to-end throughput. Accordingly, in one embodiment, the present disclosure provides a path selection metrics which represents the "path time" (e.g., the end-to-end delivery time over a network path) and is designed to maximize the path throughput while providing reasonably low latency (e.g., not exceeding a pre-defined latency threshold), by taking into account the transmission error rate, the radio channel contention, the amount of data which is queued by the transmitting nodes and/or various other parameters. The radio channel contention refers to competition of two or more network devices for access to the wireless medium. Thus, the radio channel contention may reflect a probability of frame collision caused by two or more network devices simultaneously attempting to transmit a frame over the wireless medium. In one embodiment, the radio channel contention may be measured and characterized by the number of adjacent mesh network devices utilizing the same radio channel for data transmission within a specified period of time (e.g., within a single usage of the radio channel).

The end-to-end delay may be affected by several factors. For example, lower link transmission rates would lead to longer periods of time needed to complete the end-to-end transmission of the same amount of data. Therefore, in order to minimize the end-to-end delay, the path selection metric may favor (e.g., by assigning lower metric values) the links having higher data rates.

Furthermore, a high number of nodes operating on the same radio channel and thus competing for the airtime may lead to prolonged intervals between two consecutive transmissions by a given node. Therefore, in order to minimize the end-to-end delay, the path selection metric may favor (e.g., by assigning lower metric values) the nodes operating on radio channels that are expected to have more idle time, which indicates that there are less peer nodes competing for a single radio channel.

Furthermore, a node demonstrating an average transmission rate falling below the incoming data rate (e.g., the data frames received from one or more peer nodes and/or the data frames produced by an application utilizing the node as the source node for the data transmission) may queue the outgoing data frames before transmitting them. Therefore, the path selection metric may favor (e.g., by assigning lower metric values) the nodes having smaller numbers of queued outgoing frames.

The throughput may in turn be affected by several factors. A link having the lowest throughput may become a performance bottleneck on a network path that traverses this link. The expected total transmission rate of a link may not exceed the maximum transmission rate. Therefore, in order to maximize the throughput, the path selection metric may favor (e.g., by assigning lower metric values) the links having larger margins between the actual transmission rate and the maximum transmission rate.

Furthermore, the probability of a path traversing a low performance link may increase with the increasing number of links, or hops. Therefore, in order to maximize the throughput, the path selection metric may favor (e.g., by assigning lower metric values) the paths traversing smaller number of hops (e.g., the paths exceeding the minimum number of hops among all available paths by no more than a small pre-defined constant, such as one or two hops).

Furthermore, the throughput of a link may be adversely affected by radio interference caused by other radio signal emitting devices operating in the physical proximity of the transmitting or receiving node. The adverse effect of radio interference may be mitigated by utilizing different radio channels by radio signal emitting devices operating in the physical proximity of each other. Therefore, in order to maximize the throughput, the path selection metric may favor (e.g., by assigning lower metric values) the paths having more channel diversity. Also, the path selection metric may penalize (e.g., by assigning higher metric values) consecutive or otherwise proximate links (e.g., within a pre-defined number of hops of each other) operating on the same radio channel.

Accordingly, in one embodiment, the present disclosure provides a path selection metrics which represents the "path time" (e.g., the end-to-end delivery time over a network path) and is designed to maximize the path throughput while providing reasonably low latency (e.g., not exceeding a pre-defined latency threshold), by taking into account the transmission error rate, the radio channel contention, the amount of data which is queued by the transmitting nodes and/or various other parameters.

Figure 6:
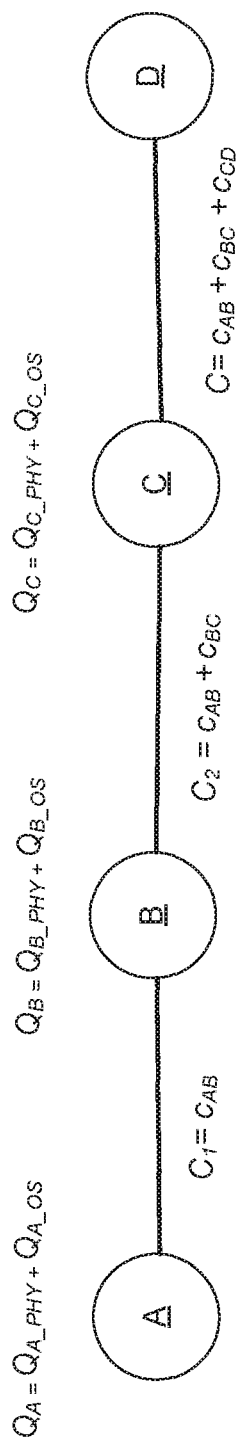
FIG. 6 schematically illustrates an example network path and corresponding path selection metric computation, in one embodiment.

FIG. 6 schematically illustrates an example network path and corresponding path selection metric computation, in one embodiment. The example network path 600 may comprise the nodes A (source node), B, C, and D (destination node).

In one embodiment, the path selection metric may represent the "path time" (e.g., the end-to-end delivery time over a network path) and thus may be represented by a sum of metric values calculated for individual links traversed by the path:

$$C = \Sigma_j c_j,$$

where C represents the path selection metric value of a path traversing j links, and $c_j$ represents the path selection metric value of $j$-th link traversed by the path, j=0, . . . , n, where n represents the number of links traversed by the path.

As schematically illustrated by FIG. 6, node A may initialize the path selection metric with zero and forward a network management frame including a RREQ information element to node B. Node B may increment the metric by the increment value $c_{AB}$ reflecting the delivery time over the A-B hop, and may forward the RREQ specifying the updated metric value $C_1 = c_{AB}$ to node C. Node C may increment the metric by the increment value $c_{BC}$ reflecting the delivery time over the B-C hop, and may forward the RREQ specifying the updated metric value $C_2 = c_{AB} + c_{BC}$ to node D. Finally, node D may increment the metric by the increment value $c_{CD}$ reflecting the delivery time over the C-D hop, and may produce the final metric value $C = c_{AB} + c_{BC} + c_{CD}$ reflecting the end-to-end delivery time over the A-B-C-D network path.

In one embodiment, the path selection metric value of a link may be represented by the ratio of the amount of data transmitted over the link within a single radio transmission to the data transmission rate of the link:

$$c_j = L_j / R_j,$$

where $L_j$ represents the amount of data in an application service data unit (ASDU) to be transmitted over the link within a single usage of a radio channel, and $R_j$ represents the data transmission rate of by the link.

In practice, the data transmission rate may be reduced by the transmission errors (which may be caused, e.g., by radio interference and/or other factors). Therefore, the data transmission rate exhibited by the link may be represented as the maximum data transmission rate multiplied by a difference between one and the transmission error rate of the link. Thus, in one embodiment, the path selection metric of a link may be represented by a ratio of the amount of data transmitted over the link within a single radio transmission to the data transmission rate exhibited by the link:

$$c_j = L_j / [R_j(1 - p_{ej})],$$

where $p_{ej}$ represents the transmission error rate of the link (e.g., expressed as the ratio of transmission errors to the total number of transmitted units of data).

Furthermore, as noted herein above, a node may be transmitting on a given radio channel during a fraction of time, while the remaining time may represent the idle time (e.g., caused by other radio signal emitting devices located within the physical proximity of the transmitting node and operating on the same radio channel).

Figure 7:
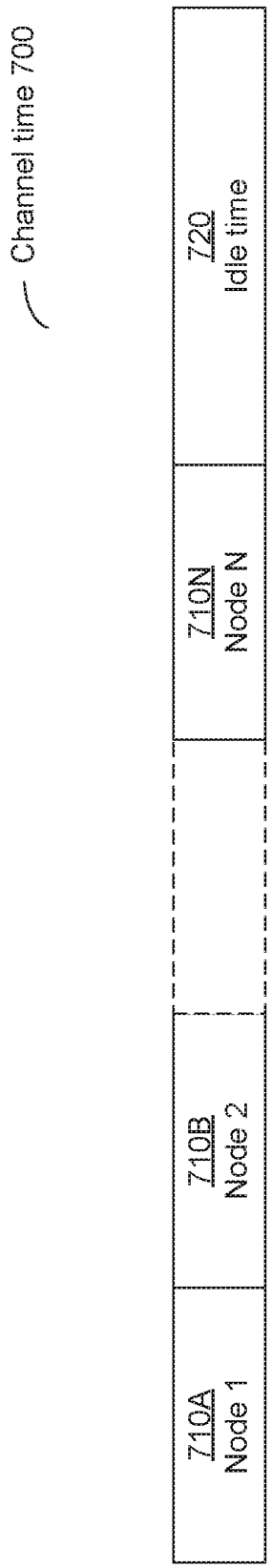
FIG. 7 schematically illustrates a timing diagram illustrating the usage of a radio channel by multiple transmitting nodes, in one embodiment

FIG. 7 schematically illustrates a timing diagram illustrating the usage of a radio channel by multiple transmitting nodes, in one embodiment. The characteristic time interval 700 may be divided between several nodes transmitting on the channel, including time intervals 710A-710N dedicated, respectively, to transmissions by nodes 1-N. The remaining time 720 is the channel idle time.

Therefore, the average transmission rate may be represented as the product of the maximum data transmission rate and the portion of time utilized by the transmitting node for transmission on the given link. Thus, in one embodiment, the path selection metric of a link may be represented by a ratio of the amount of data transmitted over the link within a single radio transmission to the average data transmission rate:

$$c_j = L_j/[R_j(1-p_{ej})P_{0j}],$$

where $P_{0j}$ represents the portion of time utilized by the transmitting node for transmission on the j-th link.

The channel idle time may represent potentially available link capacity, provided that the previous hop on the path is not utilizing the same channel for transmission, thus preventing simultaneous transmission on the next hop. The portion of the channel idle time which may represent potentially available link capacity for a given node may be reflected by the radio channel contention, which may be characterized by the number of adjacent mesh network devices utilizing the same radio channel for data transmission within a specified period of time (e.g., within a single usage of the radio channel).

Denoting the ratio of time during which node J is transmitting on the channel to the total characteristic time as $P_j$, and the ratio of idle time to the total characteristic time as $P_{idle}$, the probability of a given node transmitting on the channel may be expressed as follows:

$$P\{\text{Node } J \text{ transmitting on the channel}\} = P_j + P_{idle}.$$

Then, the probability of the given node transmitting on the channel n times during the characteristic time period may be calculated as follows:

$$P\{\text{Node } J \text{ transmitting } n \text{ times on the channel}\} = [1-(P_j+P_{idle})]^{n-1}(P_j+P_{idle}), n \geq 1$$

Therefore, the expected value of the number of transmission times may be calculated as follows:

$$E\{\text{number of transmission times by node } J\} = \Sigma k[1-(P_N+P_{idle})]^{k-1}(P_j+P_{idle}) = 1/(P_j P_{idle}).$$

Accordingly, in one embodiment, the path selection metric of a link may be represented by a ratio of the amount of data transmitted over the link within a single radio transmission to the average data transmission rate multiplied by the expected number of transmissions (which, as shown above, may be represented as $1/(P_j+P_{idle})$):

$$c_j = [L_j/R_j(1-p_{ej})])^*[1/(P_j+P_{idle})] = L_j/[R_j(1-p_{ej})(P_j+P_{idle})]$$

In one embodiment, the potentially available link capacity may be estimated by the ratio of the link's idle time $P_{idle\_j}$ to the radio channel contention indicator $I_c$ as follows: $P_{idle\_j}/I_c$. Referring again to FIG. 6, if nodes A and B utilize the same channel for transmission, the channel idle time should be divided between the two nodes, as the two nodes may not transmit simultaneously on the same channel. If, however, the nodes utilize two different channels (e.g., node A utilizes channel 1 and node B utilizes channel 2), the whole channel idle time of channel 2 may be allocated to node B as the potentially available link capacity. Accordingly, the radio channel contention indicator may be set to the value of two if the previous hop on the path utilizes the same channel for transmission, thus effectively allocating a half of the channel idle time to each of the two neighboring nodes as respective potentially available link capacity. Accordingly, the radio channel contention indicator may be set to the value of one if the previous hop on the path utilizes a different channel for transmission, thus effectively allocating the whole channel idle time to the single node utilizing the channel as the potentially available link capacity.

Therefore, in one embodiment, the path selection metric of a link may take into account the data transmission errors, the channel idle time, and the radio channel contention:

$$c_j = L_j/[R_j(1-p_{ej})(P_{0j}+P_{idle\_j}/I_c)].$$

Furthermore, as noted herein above, a node demonstrating an average transmission rate falling below the incoming data rate may queue the outgoing data frames before transmitting them. Therefore, in order to account for queuing the incoming data, the amount of data which is queued by the transmitting node may be added to the amount of data transmitted over the link within a single radio transmission. Referring again to FIG. 6, node B may have an outgoing data queue in which $Q_B$ units of data (e.g., bits) may be accumulated by the time of receiving a newly arrived ASDU by node B. In one embodiment, the node may be queueing the data at the RF module as well as at the higher protocol layers (e.g., network, transport, presentation, and/or application layers) which may be implemented by the operating system of the node. In the example of FIG. 6, the amount of data queued by node B may be computed as follows:

$$Q_B = Q_{B\_PHY} + Q_{B\_OS},$$

where $Q_{B\_pHy}$ represents the amount of data queued by the RF module of node B, and $Q_{B\_OS}$ represents the amount of data queued by the higher protocol layers (implemented by the operating system) of node B.

Accordingly, in one embodiment, the path selection metric of a link may be represented by a ratio of the sum of the amount of data transmitted over the link within a single radio transmission and the amount of data which is queued by the transmitting node to the data transmission rate exhibited by the link:

$$c_j = (L_j+Q_j)/R_j$$

where $Q_j$ represents the amount of data which is queued by the transmitting node.

Therefore, in one embodiment, the path selection metric of a link may take into account the data queuing and data transmission errors:

$$c_j = (L_j+Q_j)/[R_j(1-p_{ej})]$$

In another embodiment, the path selection metric of a link may take into account the data queuing, data transmission errors, and the channel idle time:

$$c_j = (L_j+Q_j)/[R_j(1-p_{ej})P_{0j}]$$

In another embodiment, the path selection metric of a link may take into account the data queuing, data transmission errors, the channel idle time, and the radio channel contention:

$$c_j = (L_j+Q_j)/[R_j(1-p_{ej})(P_{0j}+P_{idle\_j}/I_c)]$$

The values of various parameters which are utilized for the metric computation, including $L_j$, $Q_j$, $R_j$, $P_{0j}$, $P_{ej}$, and $P_{idlej}$ may be calculated based on the values which may be retrieved from the interfaces to the radio frequency (RF) modules (such as RF modules 404, 406, 408 of FIG. 4) by their respective drivers. The values may further be averaged over certain time periods, and may be represented by their respective moving averages, which may be recomputed periodically or upon completing every transmission. In particular, $L_j$ may represent the average amount of data in an application service data unit (ASDU), $R_j$ may represent the average data transmission rate of by the link, $P_{Oj}$ may represent the average portion of time utilized by the transmitting node for transmission on the j-th link, $p_{ej}$ may represent the average transmission error rate of the link, and $P_{idlej}$ represents the average ratio of link idle time to the total time.

The above-described path selection metrics computed as functions of the link transmission rate, data queue size, data transmission errors ratio, the channel idle time, and/or the radio channel contention above may be utilized for both dynamic and pro-active network path discovery, as described in more detail herein above with references to FIGS. 3 and 4.

Figure 8:
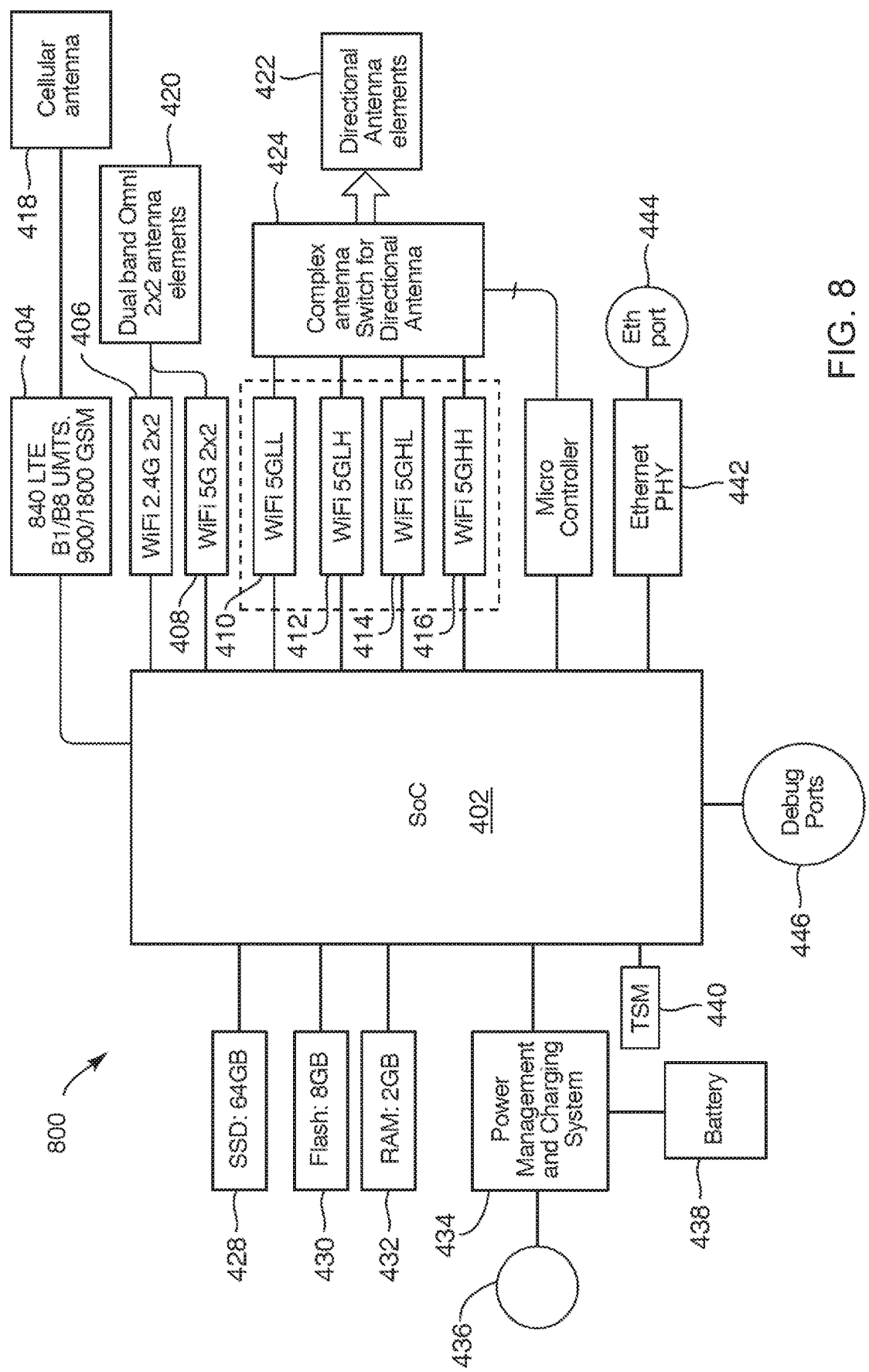
FIG. 8 is a block diagram of a mesh network device according to one embodiment.

FIG. 8 is a block diagram of a mesh network device 800 according to one embodiment. The mesh network device 800 may be one of many mesh network devices organized in a wireless mesh network (e.g., wireless mesh network 100). The mesh network device 800 is one of the nodes in a wireless mesh network in which the mesh network device 800 cooperates with other mesh network devices in distribution of content files to client consumption devices in an environment of limited connectivity to broadband Internet infrastructure, as described herein. The mesh network device 800 may be the mini-POP node 102 of FIG. 1. Alternatively, the mesh network device 800 may be any one of the mesh network devices 104-110 of FIG. 1. In another embodiment, the mesh network device 800 is any one of the network nodes 210-230 of FIG. 2.

The mesh network device 800 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 800 may include an application processor that is not necessarily considered to be a SoC.

The mesh network device 800 may also include memory and storage. For example, the mesh network device 800 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 800 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 800. Although the Ethernet port 444 could provide wired connections to client devices, the primary purpose of the Ethernet port 444 is not to connect to client devices, since the 2.4 GHz connections are used to connect to clients in the WMN. The mesh network device 800 may also include one or more debug ports 446, which are coupled to the SoC 402. The memory and storage may be used to cache content, as well as store software, firmware or other data for the mesh network device 800.

The mesh network device 800 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 800, such as for 10 minutes before the entire system is completely powered down. In some cases, power outage will likely affect a geographic area in which the mesh network device 800 is deployed (e.g., power outage that is a neighborhood wide phenomenon). The best option may be to power down the mesh network device 800 and let the cloud service (e.g., back end service) know of the outage in the WMN. The power management and charging system 434 may provide a 15V power supply up to 21 watts to the SoC 402. Alternatively, the mesh network device 800 may include more or less components to operate the multiple antennas as described herein.

The mesh network device 800 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1700 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1700. The modem may or may not support CDMA. The cellular modem may be used for diagnostics, network management, down time media caching, meta data download, or the like. Alternatively, the first RF module 404 may support other bands, as well as other cellular technologies. The mesh network device 800 may include a GPS antenna and corresponding GPS module to track the location of the mesh network device 800, such as moves between homes. However, the mesh network device 800 is intended to be located inside a structure, the GPS antenna and module may not be used in some embodiments.

The mesh network device 800 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 800 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 800 and the other mesh network devices, the client consumption devices, or both. For example, the micro controller 426 can select different combinations of the set of directional antennas 422. In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2×2 2.4 GHz MIMO radio 406 and a 2×2 5 GHz MIMO radio 408. The second set of WLAN modules includes a first 2×2 5 GHz MIMO radio 410 ("SGLL"), a second 2×2 5 GHz MIMO radio 412 ("SGLH"), a third 2×2 5 GHz MIMO radio 414 ("SGHL"), and a fourth 2×2 5 GHz MIMO radio 416 ("SGHH"). The dual-band omnidirectional antennas 420 may include a first omnidirectional antenna and a second omnidirectional antenna (not individually illustrated in FIG. 4). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 800 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 800 may be based on CSMA-CA, not TDMA. Deciding where the data will be coming into the mesh network device 800 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 800 can adapt a beam patter to be essentially fixed since the mesh network devices are not intended to move once situated.

In one embodiment, the antenna switching circuitry 424 includes multiple diplexers and switches to connect different combinations of antennas to the multiple radios. One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 800.

Figure 9:
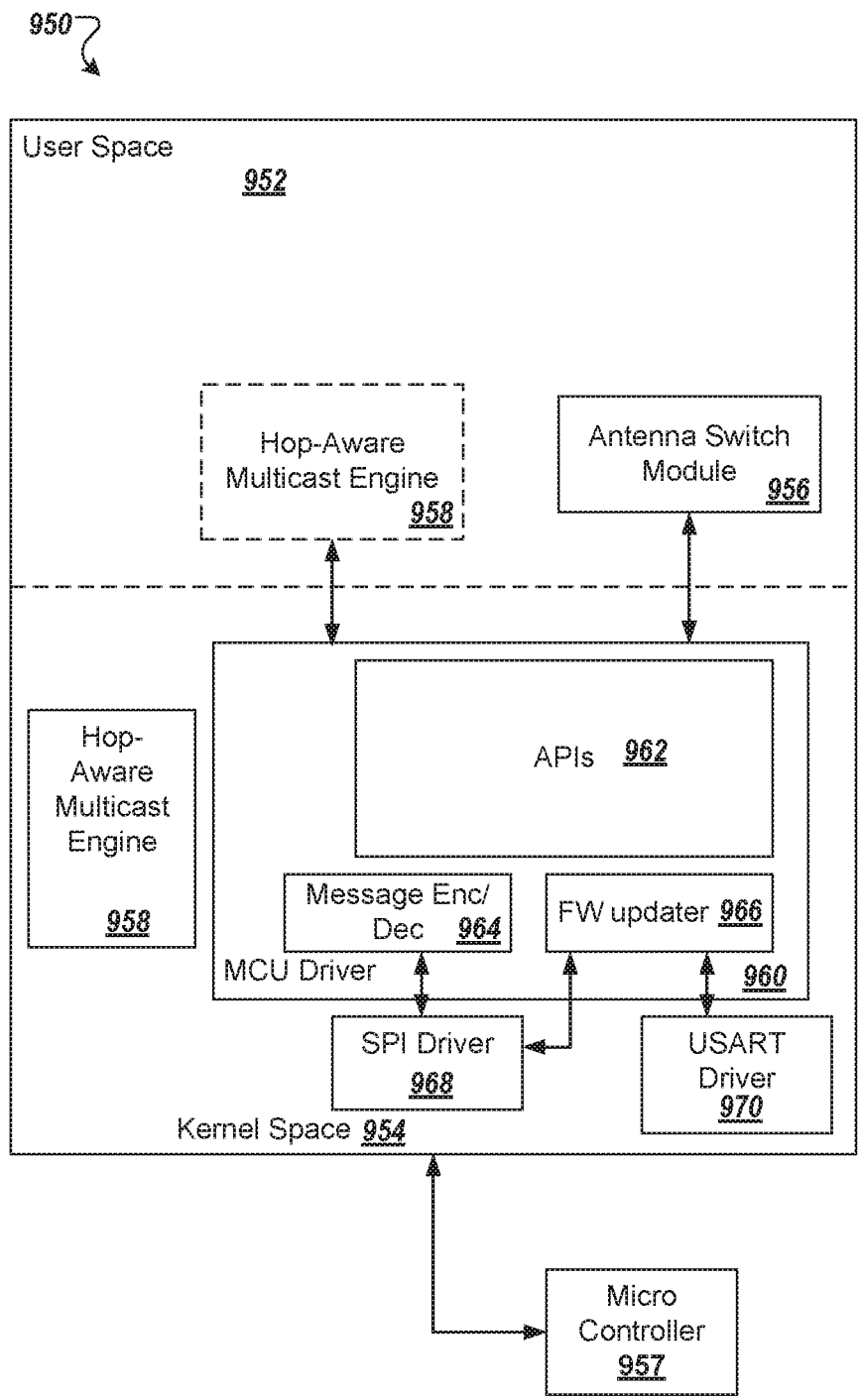
FIG. 9 is a block diagram of an application processor in which a routing engine may be implemented according to one embodiment.

FIG. 9 is a block diagram of an application processor in which a routing engine 958 may be implemented according to one embodiment. The application processor 950 executes an operating system that segregates memory (virtual memory) into user space 952 and kernel space 954. In this embodiment, routing engine 958 runs in the user space 952. In other embodiments, some or the entire routing engine 958 can be implemented in the kernel space 954. The routing engine 958 may be instructions that when executed by the application processor 950 perform various network path selection operations as described below with respect to FIGS. 10-12. The routing engine 958 can perform the network path discovery using multiple path selecting metrics, as described herein. The application processor 950 can communicate with neighbor mesh network devices to route data traffic on a network backbone of multiple P2P wireless connections between the mesh network devices.

In the kernel space 954, a micro controller unit (MCU) driver 960 can execute. The MCU driver 960 may include multiple application programming interfaces (APIs) 962 to interface to other components, such as the radios and micro controller, as described herein. The APIs 962 can communicate messages to other components and may use a message encoder/decoder 964 to encode and decode these messages. The APIs 962 may include an API for getting firmware versions, an API for updating the firmware, and an API for getting radio information (e.g., radio configuration, antenna configuration, channel information, chamber/sector information, or the like). The MCU driver 960 may also include a firmware (FW) updater 966. Also, the kernel space 954 may include a serial packet interface (SPI) driver 968 and a Universal Synchronous/Asynchronous Receiver/Transmitter (USART) driver 970.

In one embodiment, there is an interface mechanism between the user space 952 and kernel space 954 that has minimum latency. For example, in cases when there is an invalid configuration being input by an application, such as the routing engine 958, the error should be reported as quickly as possible to the application. The application processor 950 may also include power management modules in the user space 952 or in the kernel space 954 since the application processor 950 could be operating in a battery-backed operating state during power outages.

Figure 10:
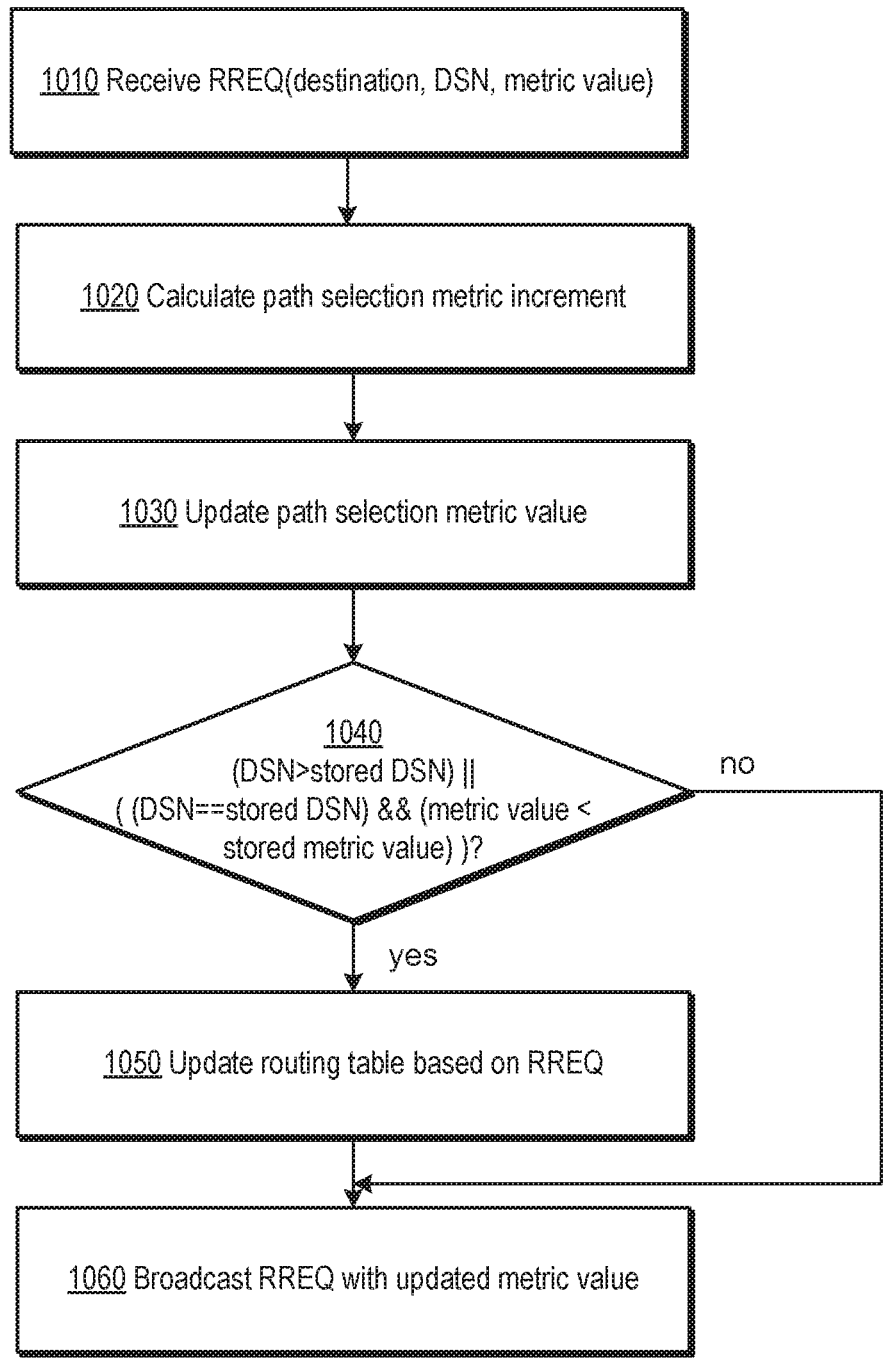
FIG. 10 is a flow diagram of one embodiment of a method for network path selection by an intermediate or a destination node responding to a route request for path discovery in a mesh network.

FIG. 10 is a flow diagram of one embodiment of a method for network path selection by an intermediate or a destination node responding to a route request for path discovery in a mesh network. The method 1000 may be performed by processing logic that comprises hardware (e.g., circuitry, dedicated logic, programmable logic, microcode, etc.), software (e.g., instructions run on a processor to perform hardware simulation), or a combination thereof. In one embodiment, the method 1000 may be performed by any one of the mesh network devices 108-100 of FIG. 1. Alternatively, the method 1000 may be performed by any one of the network nodes 210-230 of FIG. 2. Alternatively, the method 1000 may be performed by the mesh network device 800 of FIG. 8. Alternatively, the method 1000 may be performed by the application processor 990 of FIG. 9.

Referring to FIG. 10, at block 1010, the network device implementing the functions of the intermediate or destination node may receive, from a neighboring node of the mesh network, a network management frame comprising a route request. The route request may specify, among other parameters, the source node, the destination node, the DSN, and the path selection metric value, as described in more detail herein above.

At block 1020, the network device may calculate the path selection metric increment reflecting the transmission of the network management frame over the communication link leading to this node, i.e., the hop between this node and the node from which the network management frame has been received.

In one embodiment, the increment value may reflect the radio channel contention by the mesh network device implementing the method and a neighboring mesh network device. The radio channel contention may be reflected by the number of adjacent mesh network devices utilizing the same radio channel for data transmission within a specified period of time (e.g., within a single usage of the radio channel) and may be represented by a periodically computed moving average value. The path selection metric increment may further reflect the amount of data queued for transmission by the mesh network device implementing the method. The path selection metric increment may further reflect the latency of transmission of the received network management frame over the last hop leading to the mesh network device implementing the method, i.e., the hop between the mesh network device and the neighboring mesh network device from which the network management frame has been received. The path selection metric increment may further reflect the idle time of a radio channel utilized for data transmission by the mesh network device implementing the method. In one embodiment, the increment value may be represented by the ratio of an amount of data received by the mesh network device over the last hop leading to the mesh network device to the average data transmission rate by the mesh network device. The average data transmission rate may depend upon the channel contention, as described in more detail herein above.

In one embodiment, the increment value may reflect the amount of data queued for transmission by the mesh network device implementing the method. The amount of data queued for transmission by the mesh network device may be represented by a periodically computed moving average value. The path selection metric increment may further reflect the radio channel contention by the mesh network device implementing the method and a neighboring mesh network device. The amount of data queued for transmission by the mesh network device may comprise the amount of data queued by the RF module of the mesh network device and the amount of data queued by the network protocol stack of the mesh network device. The path selection metric increment may further reflect the latency of transmission of the received network management frame over the last hop leading to the mesh network device implementing the method. In one embodiment, the increment value may be represented by the ratio of the sum of the amount of data queued for transmission by the mesh network device and the amount of data received by the mesh network device over the last hop leading to the mesh network device to the average data transmission rate by the mesh network device.

In one embodiment, the increment value may reflect the amount of data queued for transmission by the first mesh network device and the radio channel contention by the mesh network device implementing the method and a neighboring mesh network device. The path selection metric increment may further reflect the latency of transmission of the received network management frame over the last hop leading to the mesh network device implementing the method. The path selection metric increment may further reflect the idle time of a radio channel utilized for data transmission by the mesh network device implementing the method.

At block 1030, the network device may update the path selection metric value specified by the route request. In one embodiment, updating the path selection metric value by the intermediate node may involve adding the computed path selection metric increment to the current path selection metric value, as described in more detail herein above.

Responsive to determining, at block 1040, that the DSN specified by the route request exceeds the stored DSN associated with the combination of the source node identifier and the path selection metric type, or that the DSNs are the same and that the updated path selection metric value is better than the path selection metric value associated with a known network path (e.g., stored in the local routing table) to the source node utilizing the same path selection metric, the network device may, at block 1050, update the known network path to the source node to specify the neighboring node (from which the router request has been received) as the next hop on the path from this network device to the source node. The updated network path may be stored in association with the DSN and the path selection metric type specified by the route request. While updating path to the source node is not needed for processing and forwarding the RREQ, it may still be performed by intermediate nodes in order to reduce the management frame traffic in the network.

At block 1060, the network device may forward the RREQ by broadcasting it to neighboring nodes of the mesh network. The forwarded RREQ may specify the updated path selection metric value, as described in more detail herein above.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method, comprising:
   receiving, by a first mesh network device of a wireless mesh network, from a second mesh network device of the wireless mesh network, a first route request identifying a destination mesh network device of the wireless mesh network and a first path selection metric value;
   determining a path selection metric increment value, wherein the path selection metric increment value reflects a radio channel contention by the first mesh network device and the second mesh network device;
   generating a second path selection metric value by adding the path selection metric increment value to the first path selection metric value; and
   broadcasting a second route request identifying the destination mesh network device and the second path selection metric value.

2. The method of claim 1, wherein the path selection metric increment value reflects a number of mesh network devices utilizing a same radio channel for data transmission within a period of time.

3. The method of claim 1, wherein the path selection metric increment value reflects an amount of data queued for transmission by the first mesh network device.

4. The method of claim 1, wherein the path selection metric increment value reflects an idle time of a radio channel utilized for data transmission by the first mesh network device.

5. The method of claim 1, wherein the path selection metric increment value reflects a latency of transmission of the first route request over a communication link between the second mesh network device and the first mesh network device.

6. The method of claim 1, wherein determining the path selection metric increment value comprises:
   calculating an amount of data received by the first mesh network device over a communication link between the second mesh network device and the first mesh network device; and
   calculating a data transmission rate by the first mesh network device; and
   calculating the path selection metric increment value using a ratio of the amount of data received by the first mesh network device to the data transmission rate.

7. The method of claim 1, wherein the first route request further specifies a source mesh network device, the method further comprising:
   determining that the second path selection metric value is less than a third path selection metric value associated with a known network path from the first mesh network device to the source mesh network device; and
   updating a next hop device identifier of the known network path using an identifier of the second mesh network device.

8. A method, comprising:
   receiving, by a first mesh network device of a wireless mesh network, from a second mesh network device of the wireless mesh network, a first route request identifying a destination mesh network device of the wireless mesh network and a first path selection metric value;
   determining a path selection metric increment value reflecting an amount of data queued for transmission by the first mesh network device;
   generating a second path selection metric value by adding the path selection metric increment value to the first path selection metric value; and
   broadcasting a second route request identifying the destination mesh network device and the second path selection metric value.

9. The method of claim 8, wherein the first mesh network device comprises an operating system implementing a network protocol stack, and wherein the amount of data is queued by the network protocol stack.

10. The method of claim 8, wherein the path selection metric increment value reflects a latency of transmission of the first route request over a communication link between the second mesh network device and the first mesh network device.

11. The method of claim 8, wherein the path selection metric increment value reflects a radio channel contention by the first mesh network device and the second mesh network device.

12. The method of claim 8, wherein the path selection metric increment value reflects an idle time of a radio channel utilized for data transmission by the first mesh network device.

13. The method of claim 8, wherein determining the path selection metric increment value comprises:
    calculating a sum of the amount of data queued for transmission by the first mesh network device and an amount of data received by the first mesh network device over a communication link between the second mesh network device and the first mesh network device;
    calculating a data transmission rate by the first mesh network device; and
    calculating the path selection metric increment value using a ratio of the sum to the data transmission rate.

14. The method of claim 8, wherein the first route request further specifies a source mesh network device, the method further comprising:
    determining that the second path selection metric value is less than a third path selection metric value associated with a known network path from the first mesh network device to the source mesh network device; and
    updating a next hop device identifier of the known network path using an identifier of the second mesh network device.

15. A first mesh network device of a wireless mesh network, comprising:
    a radio frequency (RF) module; and
    an application processor coupled to the RF module, wherein the application processor comprises a routing engine, wherein the routing engine:
        receives, by the RF module, from a second mesh network device of the wireless mesh network, a first route request identifying a destination mesh network device of the wireless mesh network and a first path selection metric value;
        determines a path selection metric increment value reflecting an amount of data queued for transmission by the first mesh network device and a radio channel contention by the first mesh network device and the second mesh network device;
        generates a second path selection metric value by adding the path selection metric increment value to the first path selection metric value; and
        broadcasts, using the RF module, a second route request identifying the destination mesh network device and the second path selection metric value.

16. The first mesh network device of claim 15, wherein the path selection metric increment value reflects a latency of transmission of the first route request over a communication link between the second mesh network device and the first mesh network device.

17. The first mesh network device of claim 15, wherein the path selection metric increment value reflects an idle time of a radio channel utilized for data transmission by the first mesh network device.

18. The first mesh network device of claim 15, wherein the path selection metric increment value reflects a number of mesh network devices utilizing a same radio channel for data transmission within a period of time.

19. The first mesh network device of claim 15, wherein the first mesh network device comprises an operating system implementing a network protocol stack, and wherein the amount of data is queued by the network protocol stack.

20. The first mesh network device of claim 15, wherein the first route request further specifies a source mesh network device, and wherein the routing engine:
    determines that the second path selection metric value is less than a third path selection metric value associated with a known network path from the first mesh network device to the source mesh network device; and
    updates a next hop device identifier of the known network path using an identifier of the second mesh network device.

\* \* \* \* \*